US012378143B2

United States Patent
Naka et al.

(10) Patent No.: US 12,378,143 B2
(45) Date of Patent: Aug. 5, 2025

(54) WATER TREATMENT SYSTEM, WATER TREATMENT METHOD, AND RECORDING MEDIUM

(71) Applicant: METAWATER Co., Ltd., Tokyo (JP)

(72) Inventors: Daisuke Naka, Tokyo (JP); Hiroyuki Takahashi, Tokyo (JP)

(73) Assignee: METAWATER Co., Ltd., Tokyo (JP)

(*) Notice: Subject to any disclaimer, the term of this patent is extended or adjusted under 35 U.S.C. 154(b) by 332 days.

(21) Appl. No.: 17/658,121

(22) Filed: Apr. 6, 2022

(65) Prior Publication Data

US 2022/0227647 A1    Jul. 21, 2022

Related U.S. Application Data

(63) Continuation-in-part of application No. PCT/JP2020/034373, filed on Sep. 10, 2020.

(30) Foreign Application Priority Data

Oct. 7, 2019    (JP) .................. 2019-184810

(51) Int. Cl.
C02F 3/20    (2023.01)
C02F 3/00    (2023.01)

(52) U.S. Cl.
CPC .............. *C02F 3/20* (2013.01); *C02F 3/006* (2013.01); *C02F 2209/03* (2013.01)

(58) Field of Classification Search
CPC .. C02F 2209/03; C02F 3/006; C02F 2209/40; C02F 2209/38; C02F 3/20; C02F 3/12; C02F 3/1278

USPC ........................................ 210/614; 261/135
See application file for complete search history.

(56) References Cited

FOREIGN PATENT DOCUMENTS

| EP | 3524576 A1 | 8/2019 |
|----|------------|--------|
| JP | 85799385 A | 6/1982 |
| JP | 2004223499 A | 8/2004 |
| JP | 2005199115 A | 7/2005 |
| JP | 2017127813 A | 7/2017 |
| JP | 2018167249 A | 11/2018 |
| JP | 2018202371 A | 12/2018 |
| WO | 2018179476 A1 | 10/2018 |

OTHER PUBLICATIONS

Ootani, JPS5799385A, English machine translation, pp. 1-3 (Year: 1982).*
Takahashi et al., WO 2018179476, English machine translation, pp. 1-19 (Year: 2018).*
Oct. 4, 2023, the Extended European Search Report issued by the European Patent Office in the corresponding European Patent Application No. 20874824.4.

(Continued)

*Primary Examiner* — Claire A Norris
(74) *Attorney, Agent, or Firm* — KENJA IP LAW PC

(57) ABSTRACT

A water treatment system includes a plurality of tanks; a plurality of blow systems connected to tanks respectively; a blower unit configured to supply air to tanks through the air blow systems; and a control device configured to: calculate a pressure loss in each of the air blow systems; and control supply of water to be treated to each of the tanks, according to the calculated pressure losses.

15 Claims, 3 Drawing Sheets

(56) References Cited

OTHER PUBLICATIONS

Apr. 12, 2022, International Preliminary Report on Patentability issued in the International Patent Application No. PCT/JP2020/034373.
Mar. 5, 2024, Notification of Reasons for Refusal issued by the Japan Patent Office in the corresponding Japanese Patent Application No. 2021-550537.
Nov. 17, 2020, International Search Report issued in the International Patent Application No. PCT/JP2020/034373.

* cited by examiner

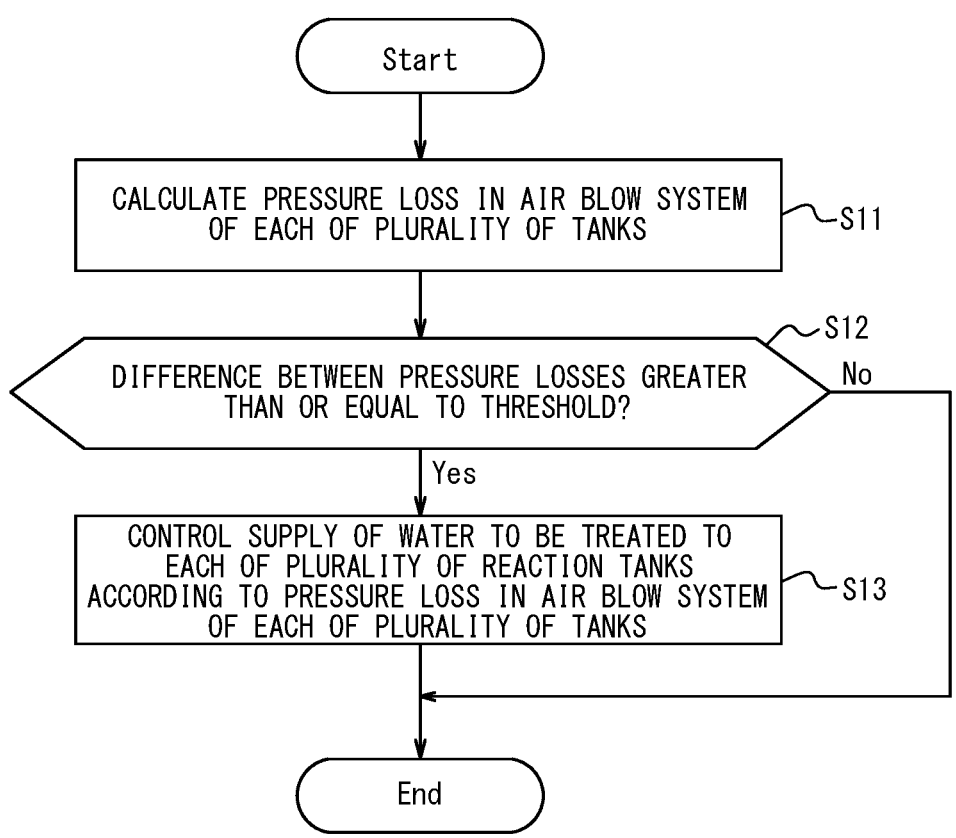

WATER TREATMENT SYSTEM, WATER TREATMENT METHOD, AND RECORDING MEDIUM

TECHNICAL FIELD

The present disclosure relates to a water treatment system, a water treatment method, and a recording medium.

BACKGROUND OF THE INVENTION

As a water treatment system for treating water to be treated such as domestic wastewater or industrial wastewater, a system that performs biological treatment on water to be treated is available. In such a water treatment system, while flowing water to be treated into a tank, aeration treatment of supplying air to aerobic microorganisms existing in the tank is performed. Organic matter contained in the water to be treated in the tank is decomposed by the aerobic microorganisms, and as a result stable treated water quality is obtained.

SUMMARY OF THE INVENTION

A water treatment system according to one of the disclosed embodiments includes: a plurality of tanks; a plurality of blow systems connected to tanks respectively; a blower unit configured to supply air to tanks through the air blow systems; and a control device configured to: calculate a pressure loss in each of the air blow systems; and control supply of water to be treated to each of the tanks, according to the calculated pressure losses.

BRIEF DESCRIPTION OF FIGURES

FIG. 3 is a flowchart illustrating an example of the operation of the water treatment system illustrated in FIG. 1.

DETAILED DESCRIPTION

Figure 1:
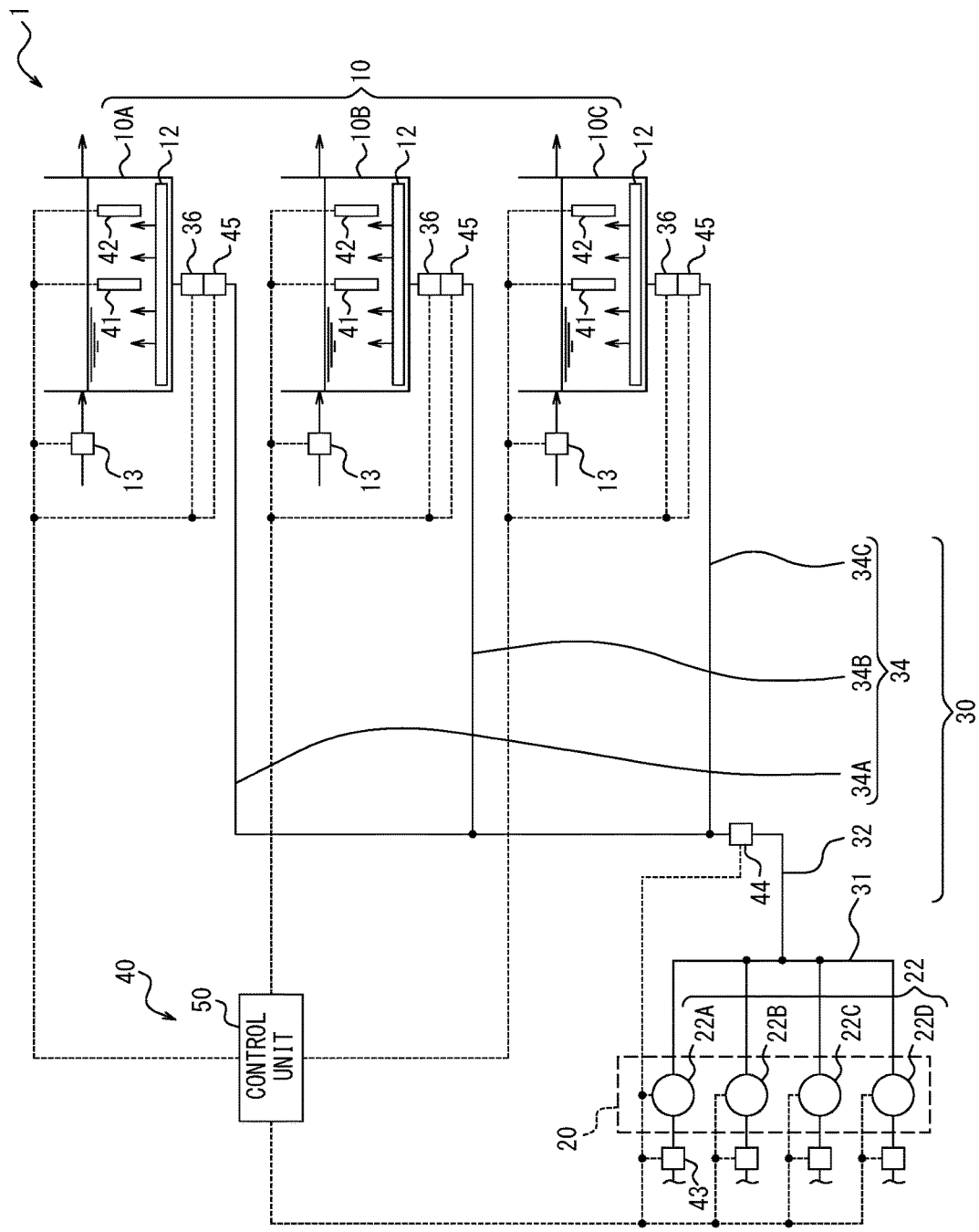
FIG. 1 is a diagram illustrating an example of the structure of a water treatment system according to one of the disclosed embodiments.

One method of supplying air from a blower unit to each of a plurality of tanks through an air blow pipe in the foregoing water treatment system is a method (first method) of calculating expected maximum pressure loss and supplying air to each of a plurality of tanks at the air blow pressure corresponding to the calculated pressure loss. Another method is a method (second method) of calculating, based on the water quality of water to be treated in each of a plurality of tanks, the amount of air necessary for treating the water to be treated and the pressure loss of an air blow pipe and the like and supplying air to each of the plurality of tanks at the air blow pressure corresponding to the maximum pressure loss out of the calculated pressure losses (see JP 2018-167249 A).

With the foregoing first method, air is supplied to each tank at the air blow pressure corresponding to the expected maximum pressure loss, and thus there is a possibility that air is supplied to each tank at excessive pressure. With the foregoing second method, air is supplied to each tank at the air blow pressure corresponding to the maximum pressure loss calculated based on the water quality, and thus there is a possibility that air is supplied to each tank other than the tank corresponding to the calculated maximum pressure loss at excessive pressure. Accordingly, with the first and second methods, the electricity (air blow electricity) consumed by the blower unit for blowing air is wasted, and efficient use of electricity in water treatment cannot be achieved.

There is thus a need to reduce wasted air blow electricity of a blower unit and achieve efficient use of electricity in water treatment.

One of the disclosed embodiments will be described in detail below, with reference to the drawings. In the drawings, the same reference signs represent the same or equivalent components.

FIG. 1 is a diagram illustrating an example of the structure of a water treatment system 1 according to one of the disclosed embodiments. The water treatment system 1 according to this embodiment is a system that performs aeration treatment on water to be treated. The water to be treated is any of various types of water subjected to aeration treatment. Non-limiting examples of the water to be treated include domestic wastewater, industrial wastewater, rainwater, human waste, supernatant liquor after sludge dewatering process in sewerage treatment plants, and wastewater such as leachate in landfills.

The water treatment system 1 illustrated in FIG. 1 includes tanks 10A, 10B, and 10C, a blower unit 20, an air blow pipe 30 as an air blow system, and a control apparatus 40. In the water treatment system 1, the control apparatus 40 controls the amount of air supplied from the blower unit 20 to each of the tanks 10A, 10B, and 10C and the supply of water to be treated to each of the tanks 10A, 10B, and 10C to perform biological treatment on the water to be treated in each of the tanks 10A, 10B, and 10C. Hereafter, the tanks 10A, 10B, and 10C are collectively referred to as "tank 10" when not distinguished from one another.

Each tank 10 is a tank that has an air diffuser 12 inside and in which activated sludge is stored. The water to be treated is flown (supplied) into the tank 10 through a water pump 13. The air diffuser 12 aerates the activated sludge stored in the tank 10 with the air supplied from the blower unit 20. The tank 10 biologically treats the water to be treated in the tank 10 with the aerated activated sludge, and discharges the treated water after the biological treatment.

The water to be treated is supplied to the tanks 10A, 10B, and 10C in parallel. Although this embodiment describes an example in which the water treatment system 1 includes three tanks 10A, 10B, and 10C, the presently disclosed techniques are not limited to such. The water treatment system 1 includes a plurality of tanks 10. Hence, the water treatment system 1 may include two tanks 10 or four or more tanks 10.

The blower unit 20 includes air blowers 22A, 22B, 22C, and 22D. The air blowers 22A, 22B, 22C, and 22D are blowers having the same function. The blower unit 20 supplies air for biological treatment to the plurality of tanks 10A, 10B, and 10C through the air blow pipe 30 as an air blow system. Hereafter, the air blowers 22A, 22B, 22C, and 22D are collectively referred to as "air blower 22" when not distinguished from one another.

Each air blower 22 is a blower that introduces air from the outside and discharges the introduced air by a rotating blade portion. Non-limiting examples of the blower 22 include an inlet vane type blower, an inverter type blower, and a gear type blower. The air blowers 22 are connected to the air blow pipe 30 in parallel with one another on the side where air is discharged from the blade portion, and discharge air to the air blow pipe 30. Although this embodiment describes an example in which the blower unit 20 includes four air blowers 22A, 22B, 22C, and 22D, the presently disclosed techniques are not limited to such. The blower unit 20 may include any number of air blowers 22. That is, the blower unit 20 includes one or more air blowers 22.

The air blow pipe 30 is a pipe that conducts air inside. The air blow pipe 30 is connected to the tanks 10A, 10B, and 10C. The air blow pipe 30 includes an introduction pipe 31, a header pipe 32, and branch pipes 34A, 34B, and 34C. The air blow systems corresponding to the tanks 10A, 10B, and 10C respectively include the branch pipes 34A, 34B, and 34C respectively, and the air blow systems corresponding to the tanks 10A, 10B, and 10C respectively further include air diffusers 12 respectively. The air blow systems is connected to the header pipe 32. The introduction pipe 31 is a pipe that has one end branched and connected to the air blowers 22A, 22B, 22C, and 22D and is supplied with air from each air blower 22. The introduction pipe 31 has the other end connected to the header pipe 32, and merges the air supplied from the air blowers 22 and introduces the merged air into the header pipe 32. The header pipe 32 has one end connected to the introduction pipe 31, and the other end connected to the branch pipes 34A, 34B, and 34C.

The branch pipe 34A is a pipe that has one end connected to the header pipe 32 and the other end connected to the air diffuser 12 in the tank 10A. The branch pipe 34A supplies part of the air supplied from the header pipe 32, to the tank 10A. The branch pipe 34B is a pipe that has one end connected to the header pipe 32 and the other end connected to the air diffuser 12 in the tank 10B. The branch pipe 34B supplies part of the air supplied from the header pipe 32, to the tank 10B. The branch pipe 34C is a pipe that has one end connected to the header pipe 32 and the other end connected to the air diffuser 12 in the tank 10C. The branch pipe 34C supplies part of the air supplied from the header pipe 32, to the tank 10C. Hereafter, the branch pipes 34A, 34B, and 34C are collectively referred to as "branch pipe 34" when not distinguished from one another.

Each branch pipe 34 is provided with an introduction valve 36. The introduction valve 36 is a valve that is opened and closed by the control apparatus 40. The introduction valve 36 adjusts the amount of air supplied from the branch pipe 34 to the tank 10 by adjusting the degree of opening.

The control apparatus 40 is a device that controls the amount of air supplied to each tank 10. The control apparatus 40 also controls the supply of the water to be treated to each tank 10 through the water pump 13. The control apparatus 40 includes a nitric acid meter 41, an ammonia meter 42, an intake air measurement unit 43, a header pipe internal pressure measurement unit 44, a branch pipe air volume measurement unit 45, and a control unit 50.

In the tank 10, ammoniacal nitrogen in the water to be treated is nitrified into nitrite nitrogen and nitrate nitrogen by nitrifying bacteria which are aerobic microorganisms in activated sludge under aerobic conditions. Meanwhile, in a region where the amount of oxygen in the water to be treated is low in the tank 10, denitrification reaction by denitrifying bacteria occurs. By supplying a carbon source sufficient for denitrification reaction, the denitrification reaction can progress sufficiently. Consequently, in the region where the denitrification reaction occurs, nitrogen can be removed by decomposing nitrous oxide gas generated due to insufficient nitrification or reducing nitrite and decomposing it into nitrogen and carbon dioxide without generating nitrous oxide.

The nitric acid meter 41 is a sensor that is provided in each tank 10 and measures the nitric acid concentration in the water to be treated in the tank 10 to detect the degree of progress of denitrification reaction, i.e. the degree of decomposition of nitric acid. Herein, nitric acid in the water to be treated represents a concept that includes nitric acid ($HNO_3$), nitrite ($HNO_2$), nitrate nitrogen ($NO_3$—N), nitrite nitrogen ($NO_2$—N), an assembly of nitrate nitrogen and nitrite nitrogen, and $NO_x$.

The ammonia meter 42 is a sensor that is provided in each tank 10 and measures the ammonia concentration in the water to be treated in the tank 10 to detect the degree of progress of nitrification reaction, i.e. the degree of decomposition of ammonia. Herein, ammonia in the water to be treated represents a concept that includes ammonia and ammoniacal nitrogen.

The intake air measurement unit 43 is an airflow meter that is provided on the intake side of each air blower 22 and measures the amount of air taken in by the air blower 22.

The header pipe internal pressure measurement unit 44 is a pressure gauge that is attached to the header pipe 32 and measures the internal pressure of the header pipe 32, i.e. the pressure of air from the blower unit 20.

The branch pipe air volume measurement unit 45 is provided in each branch pipe 34. Specifically, the branch pipe air volume measurement unit 45 is an airflow meter that is provided in the branch pipe 34 between the introduction valve 36 and the header pipe 32 and measures the amount of air supplied from the branch pipe 34 to the tank 10. In the case where the branch pipe air volume measurement unit 45 as an airflow meter is provided in each branch pipe 34, a pressure gauge may be provided in the branch pipe 34 instead of the header pipe internal pressure measurement unit 44.

The control unit 50 controls the amount of air supplied to each tank 10 based on the measurement results of the foregoing components. The control unit 50 also controls the supply of the water to be treated to each of the plurality of tanks 10 according to the calculation result of the pressure loss in the air blow system of each of the plurality of tanks 10. Specifically, the control unit 50 calculates the pressure loss in each of the plurality of air blow systems, and controls the supply of the water to be treated to each of the plurality of tanks 10 according to the calculated respective pressure losses in the plurality of air blow systems.

Figure 2:
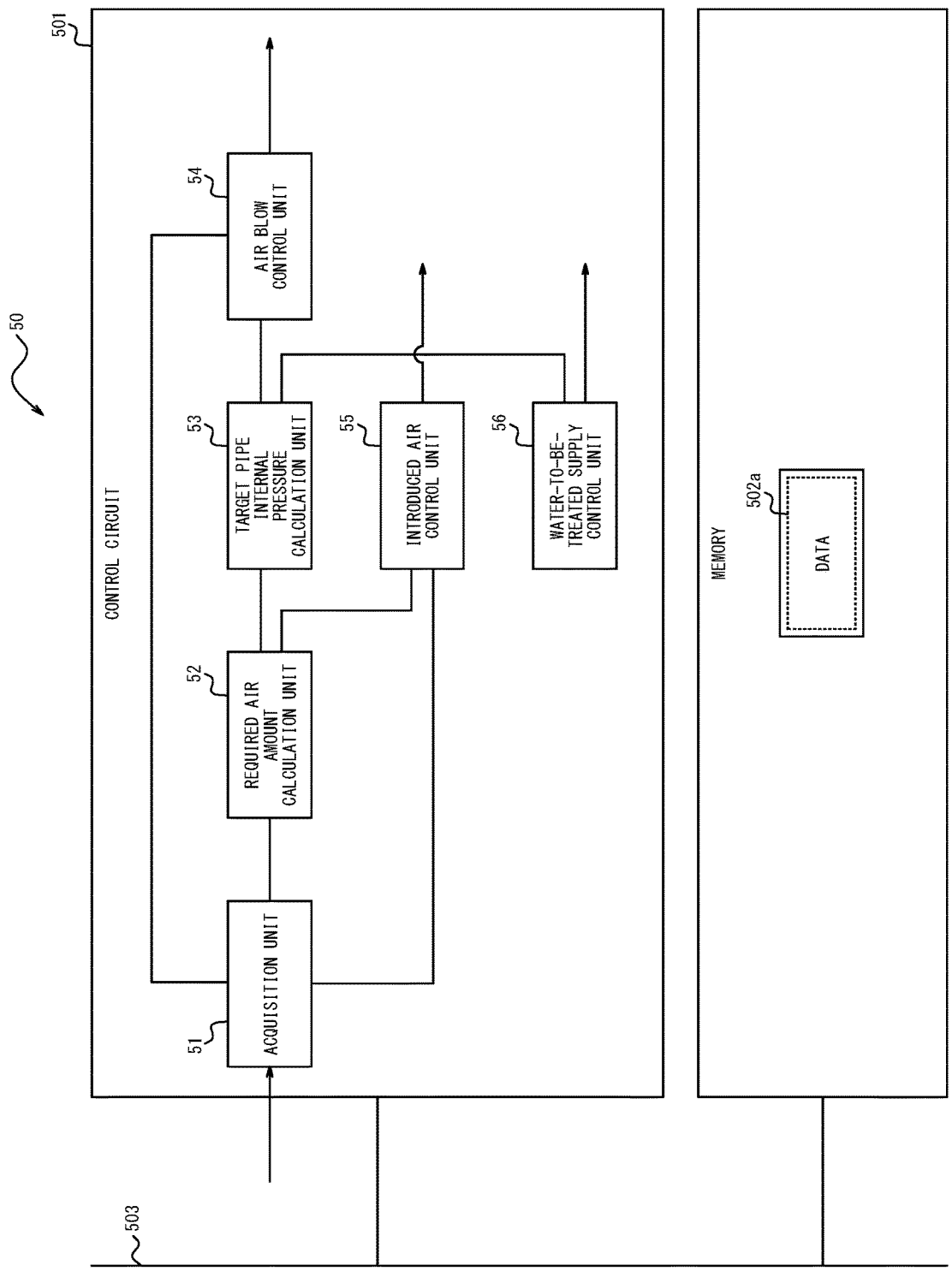
FIG. 2 is a block diagram illustrating an example of the structure of a control unit illustrated in FIG. 1.

FIG. 2 is a block diagram illustrating an example of the structure of the control unit 50.

The control unit 50 (control device) illustrated in FIG. 2 includes a control circuit 501, a memory 502, and a bus 503. The control circuit 501 can access the memory 502 via the bus 503. The control circuit 501 is an electric circuit. For example, the control circuit 501 may be any of a processor, a central processing unit (CPU), an application specific integrated circuit (ASIC), an application specific instruction-set processor (ASIP), a field-programmable gate array (FPGA), and a system-on-a-chip (SoC). The memory 502 is any of various types of recording media. The memory 502 is, for example, an electric circuit. For example, the memory 502 may be a random access memory (RAM), a read only memory (ROM), a hard disk drive (HDD), or a solid state drive (SDD), or may be a non-transitory computer-readable medium storing instructions executable by one or more control circuits. The memory 502 stores data 502a. For example, the data 502a may be data (such as the below-described water quality-air amount relationship) accessed during execution by the control circuit 501, or a program according to this embodiment executed by the control circuit 501.

The control circuit 501 includes an acquisition unit 51, a required air amount calculation unit 52, a target pipe internal pressure calculation unit 53, an air blow control unit 54, an introduced air control unit 55, and a water-to-be-treated supply control unit 56. For example, the control unit 50 can be implemented by a computer (e.g. a personal computer) including a CPU and a memory. In the case where the control unit 50 is implemented by the computer, the foregoing components in the control unit 50 are implemented by the CPU reading a program according to this embodiment stored in the memory and executing it.

The acquisition unit 51 acquires the measurement results of the nitric acid meter 41, the ammonia meter 42, the intake air measurement unit 43, the header pipe internal pressure measurement unit 44, and the branch pipe air volume measurement unit 45. The acquisition unit 51 outputs the measurement results of the nitric acid meter 41, the ammonia meter 42, and the branch pipe air volume measurement unit 45 to the required air amount calculation unit 52. The acquisition unit 51 outputs the measurement results of the intake air measurement unit 43 and the header pipe internal pressure measurement unit 44 to the air blow control unit 54. The acquisition unit 51 outputs the measurement result of the branch pipe air volume measurement unit 45 to the introduced air control unit 55.

The required air amount calculation unit 52 calculates, for each tank 10, the amount of air (required air amount) necessary for adjusting the water quality of the water to be treated in the tank 10 to predetermined target water quality, based on accumulated data from past to present of the state of the water to be treated in the tank 10 (the nitric acid concentration and the ammonia concentration of the water to be treated) and the measurement result of the branch pipe air volume measurement unit 45 output from the acquisition unit 51.

For example, the required air amount calculation unit 52 stores a predetermined water quality-air amount relationship, and calculates the required air amount based on the water quality-air amount relationship. The water quality-air amount relationship is the relationship between the amount of air supplied to the tank 10 and the change in water quality in the tank 10 in the case where the amount of air is supplied. From the predetermined water quality-air amount relationship, the required air amount calculation unit 52 calculates, as the required air amount, such an amount of air with which the nitric acid concentration of the water to be treated measured by the nitric acid meter 41 and the ammonia concentration of the water to be treated measured by the ammonia meter 42 match the respective target concentrations. Although this embodiment describes a method of calculating the required air amount based on the measurement results of the nitric acid meter 41, the ammonia meter 42, and the branch pipe air volume measurement unit 45, the presently disclosed techniques are not limited to such. Any method that can calculate the amount of air necessary for bringing the water to be treated to the predetermined target water quality may be used.

The required air amount calculation unit 52 outputs the calculation result of the required air amount for each tank 10 to the target pipe internal pressure calculation unit 53 and the introduced air control unit 55.

The target pipe internal pressure calculation unit 53 calculates a target value (target pipe internal pressure) of the pressure of air in the air blow pipe 30, based on the required air amount for each tank 10 calculated by the required air amount calculation unit 52. The target pipe internal pressure is pressure set as the target pressure of the header pipe internal pressure measurement unit 44 necessary to supply air of the required air amount to each tank 10.

The target pipe internal pressure calculation unit 53 calculates pipe pressure loss $H_P$ which is the pressure of air lost due to pressure loss in the air blow pipe 30 in the case where air of the target air amount calculated by the required air amount calculation unit 52 is supplied to the tank 10.

The pipe pressure loss H of a pipe is typically calculated based on the following Formulas (1) and (2):

$$H = 4 \cdot f_1 \cdot (1/d) \cdot (\gamma \cdot v^2 / 2) \qquad \text{Formula (1)}$$

$$H = f_2 \cdot (\gamma \cdot v^2 / 2) \qquad \text{Formula (2).}$$

Formula (1) is a formula for calculating the pipe pressure loss H in the case where the pipe is a straight pipe. Formula (2) is a formula for calculating the pipe pressure loss H in the case where the pipe is a deformed pipe other than a straight pipe. $f_1$ and $f_2$ are loss coefficients, which are predetermined constants. l is the pipe length (m) of the straight pipe. d is the inner diameter (m) of the straight pipe. The pipe length l and the pipe inner diameter d are constants that depend on the shape of the pipe. $\gamma$ is the air density (kg/m$^3$), which is a predetermined constant. v is the flow velocity (m/s) of air. In Formulas (1) and (2), the flow velocity v is a variable. Hence, the pipe pressure loss H of the pipe changes according to the flow velocity v. The flow velocity v is proportional to the flow quantity Q of air as defined in the following Formula (3). In Formula (3), A is the flow path area, which is a constant that depends on the shape of the pipe:

$$Q = A \cdot v \qquad \text{Formula (3).}$$

Thus, the pipe pressure loss H can be calculated based on the flow quantity Q of air, i.e. the required air amount. The target pipe internal pressure calculation unit 53 calculates the flow velocity v of air in the case where air of the required air amount is flown through the header pipe 32 and the branch pipe 34, based on Formula (3). The target pipe internal pressure calculation unit 53 then calculates the pipe pressure loss $H_P$ from Formulas (1) and (2), using the calculated flow velocity v and the foregoing constants. Specifically, the target pipe internal pressure calculation unit 53 calculates pipe pressure loss $H_{PA}$ in the path from the blower unit 20 to the tank 10A, pipe pressure loss $H_{PB}$ in the path from the blower unit 20 to the tank 10B, and pipe pressure loss $H_{PC}$ in the path from the blower unit 20 to the tank 10C.

Following this, the target pipe internal pressure calculation unit 53 calculates pressure loss $H_L$ in the air blow system of each of the plurality of tanks 10, based on the following Formula (4):

$$H_L = h + H_P + H_M + H_A \qquad \text{Formula (4).}$$

In Formula (4), h is the water head pressure of the water to be treated in the tank 10. $H_M$ is the loss pressure (ventilation pressure loss) by the header pipe internal pressure measurement unit 44, the branch pipe air volume measurement unit 45, and the introduction valve 36. $H_A$ is the loss pressure (air diffuser pressure loss) by the air diffuser 12. The water head pressure h is, for example, calculated from the volume of the tank 10 beforehand. A sensor for measuring the water level or the amount of water may be provided in the tank 10, and the water head pressure h may be obtained from the measurement result of the sensor. In this embodiment, the same amount of treated water as the water to be treated flowing into the tank 10 flows out of the tank 10. Hence, the water head pressure h is constant. The ventilation pressure loss $H_M$ is a design value or a value measured beforehand. The air diffuser pressure loss $H_A$ is pressure that depends on the pollutant load of the water to be treated in the tank 10, which is fixed pressure or pressure proportional to the square of the supplied air volume depending on the device type of the air diffuser 12. The pollutant load is expressed as the product of the amount of the water to be treated supplied to the tank 10 and the concentration (pollutant concentration such as biochemical oxygen demand (BOD), chemical oxygen demand (COD), or NH4) of the water to be treated supplied to the tank 10.

In Formula (4), the pressure loss $H_L$ in the air blow system is calculated as the sum of the water head pressure h of the water to be treated in the tank 10, the pipe pressure loss $H_P$, the ventilation pressure loss $H_M$, and the air diffuser pressure loss $H_A$. However, the pressure loss $H_L$ in the air blow system is not limited to such. For example, in the case where the header pipe 32 is shared by the respective air blow systems of the plurality of tanks 10, the pressure loss $H_L$ in the air blow system may be at least one of the pressure loss (first pressure loss) in the branch pipe 34 included in the air blow system, the pressure loss (second pressure loss) corresponding to the water head pressure of the water to be treated in the tank 10 connected to the branch pipe 34, and the pressure loss (third pressure loss) by the air diffuser 12 in the tank 10. The pressure loss $H_L$ may be the sum of at least two of the first pressure loss, the second pressure loss, the third pressure loss, and the pressure loss (fourth pressure loss) in the header pipe 32 included in the air blow system. An example of calculating the pressure loss $H_L$ based on the foregoing Formula (4) will be described below.

The target pipe internal pressure calculation unit 53 calculates the pressure loss $H_L$ in the air blow system of each of the plurality of tanks 10. In detail, the target pipe internal pressure calculation unit 53 calculates the sum of the water head pressure h of the tank 10A, the pipe pressure loss $H_{PA}$, the ventilation pressure loss $H_{MA}$ of the path from the blower unit 20 to the tank 10A, and the air diffuser pressure loss $H_{AA}$ by the air diffuser 12 in the tank 10A, as the pressure loss $H_{LA}$ in the air blow system of the tank 10A. In the same manner, the target pipe internal pressure calculation unit 53 calculates the pressure loss $H_{LB}$ in the air blow system of the tank 10B and the pressure loss $H_{LC}$ in the air blow system of the tank 10C. The foregoing method of calculating the pressure loss $H_L$ is merely an example, and any method that can calculate the pressure loss $H_L$ in the air blow system of each of the plurality of tanks 10 may be used.

The target pipe internal pressure calculation unit 53 determines the maximum value out of the respective pressure losses $H_L$ (pressure losses $H_{LA}$, $H_{LB}$, and $H_{LC}$) in the air blow systems of the plurality of tanks 10, as the target pipe internal pressure. The target pipe internal pressure calculation unit 53 outputs the calculation result of the target pipe internal pressure to the air blow control unit 54. The target pipe internal pressure calculation unit 53 also outputs the calculation result of the pressure loss $H_L$ in the air blow system of each of the plurality of tanks 10 to the water-to-be-treated supply control unit 56.

The air blow control unit 54 controls the supply of air from the blower unit 20 so that the pressure measured by the header pipe internal pressure measurement unit 44 will match the target pipe internal pressure calculated by the target pipe internal pressure calculation unit 53. Specifically, the air blow control unit 54 controls the amount of air supplied from the blower unit 20 so that the internal pressure in the header pipe 32 measured by the header pipe internal pressure measurement unit 44 will match the target pipe internal pressure, based on the measurement result of the intake air measurement unit 43.

The introduced air control unit 55 controls the degree of opening of the introduction valve 36 so that the amount of air supplied to the tank 10, which is measured by the branch pipe air volume measurement unit 45, will match the required air amount calculated by the required air amount calculation unit 52. Specifically, the introduced air control unit 55 controls the degree of opening of the introduction valve 36 so that the amount of air supplied to the tank 10 will follow the target air amount, by PID (proportional integral differential) control using the target air amount as the target value and the measurement result of the branch pipe air volume measurement unit 45.

The water-to-be-treated supply control unit 56 controls the supply of the water to be treated to each of the plurality of tanks 10 through the water pump 13, according to the pressure loss $H_L$ in the air blow system of each of the plurality of tanks 10 calculated by the target pipe internal pressure calculation unit 53. Specifically, the water-to-be-treated supply control unit 56 controls the supply of the water to be treated to each of the plurality of tanks 10 so as to equalize the respective pressure losses $H_L$ in the plurality of air blow systems.

By controlling the supply of the water to be treated to each tank 10, the required air amount in each tank 10 changes, and the amount of air blown in the air blow system of each tank 10 changes. Therefore, by controlling the supply of the water to be treated to each of the plurality of tanks 10 so as to equalize the respective pressure losses $H_L$ in the plurality of air blow system, the respective pressure losses in the air blow systems can be equalized. As a result of the respective pressure losses in the air blow systems being equalized, the wasted air blow electricity of the blower unit 20 caused by supplying air to the air blow system of each tank 10 at excessive pressure can be reduced, and efficient use of electricity in water treatment can be achieved. The control of the supply of the water to be treated to each tank 10 will be described in detail later.

The operation of the water treatment system 1 according to this embodiment will be described below. FIG. 3 is a flowchart illustrating an example of the operation of the water treatment system 1 according to this embodiment, for describing a water treatment method in the water treatment system 1. The operation relating to the control of the supply of water to be treated to each tank 10 will be mainly described below with reference to FIG. 3.

The target pipe internal pressure calculation unit 53 calculates the pressure loss $H_L$ in the air blow system of each of the plurality of tanks 10 (step S11). As mentioned above, the target pipe internal pressure calculation unit 53 calculates the sum of the water head pressure h of the tank 10, the pipe pressure loss $H_P$ in the air blow pipe 30, the ventilation pressure loss $H_M$, and the air diffuser pressure loss $H_A$, as the pressure loss $H_L$ in the air blow system.

Next, the water-to-be-treated supply control unit 56 determines whether the difference between the pressure loss $H_L$ (maximum pressure loss) in the air blow system maximum in pressure loss $H_L$ and the pressure loss $H_L$ (minimum pressure loss) in the air blow system minimum in pressure loss $H_L$ is greater than or equal to a predetermined threshold (step S12). The threshold may be, for example, a numeric value (e.g. 0.5 kPa) set by an administrator of the water treatment system 1. The threshold may be, for example, the ratio (e.g. 5%) of the difference between the maximum pressure loss and the minimum pressure loss to the maximum pressure loss, which is set by the administrator of the water treatment system 1.

In the case where the water-to-be-treated supply control unit 56 determines that the difference between the maximum pressure loss and the minimum pressure loss is less than the predetermined threshold (step S12: No), the water-to-be-treated supply control unit 56 ends the process.

In the case where the water-to-be-treated supply control unit 56 determines that the difference between the maximum pressure loss and the minimum pressure loss is greater than or equal to the predetermined threshold (step S12: Yes), the water-to-be-treated supply control unit 56 controls the supply of the water to be treated to each of the plurality of tanks 10 according to the pressure loss $H_L$ in the air blow system of each of the plurality of tanks 10 (step S13). Specifically, the water-to-be-treated supply control unit 56 controls the supply of the water to be treated to each of the plurality of tanks 10 so as to equalize the respective pressure losses $H_L$ in the plurality of air blow systems. In the case where the water-to-be-treated supply control unit 56 controls the supply of the water to be treated to each of the plurality of tanks 10 according to the pressure loss $H_L$ in the air blow system of each of the plurality of tanks 10, the water-to-be-treated supply control unit 56 may notify the administrator of the water treatment system 1 of the control.

Thus, the water treatment method according to this embodiment includes: calculating the pressure loss $H_L$ in the air blow system of each of the plurality of tanks 10; and controlling the supply of the water to be treated to each of the plurality of tanks 10 according to the pressure loss $H_L$ in the air blow system of each of the plurality of tanks 10. The pressure loss $H_L$ in the air blow system of each of the plurality of tanks 10 may be calculated outside the water treatment system 1.

For example, the water treatment system 1 performs the process described with reference to FIG. 3 at a predetermined frequency (e.g. once a day). The water treatment system 1 may perform the process described with reference to FIG. 3 in real time. In the case of performing the process described with reference to FIG. 3 in real time, the water-to-be-treated supply control unit 56 controls the supply of the water to be treated to each tank 10 at a speed corresponding to the time until the water to be treated supplied to the tank 10 is subjected to biological treatment and the treated water is flown out of the tank 10.

The operation of the water treatment system 1 according to this embodiment will be described in more detail below. For comparison, the operation in the case of applying each of the first and second methods described above to a water treatment system that includes the tanks 10 (the tanks 10A, 10B, and 10C), the blower unit 20, and the air blow pipe 30 illustrated in FIG. 1 will be described first. It is assumed here that the amount of water to be treated in the tanks 10A, 10B, and 10C is constant and the water head pressure h is 60 kPa. It is also assumed that the ventilation pressure loss $H_M$ is a constant value, and its description is omitted. Suppose, in the first and second methods, the same amount of water to be treated is supplied to each tank 10. For example, the water to be treated of 2000 m³/hr in water amount is supplied to each tank 10.

The operation in the case of applying the first method will be described below. In the first method, the expected maximum pressure loss $H_L$ is calculated, and air is supplied to the plurality of tanks 10 at the air blow pressure corresponding to the calculated pressure loss $H_L$, as mentioned above. Suppose the pipe pressure loss $H_P$ in the path of the air blow pipe 30 from the blower unit 20 to the tank 10A is 5 kPa at the maximum, and the air diffuser pressure loss $H_A$ in the air diffuser 12 is 3 kPa at the maximum. In this case, the sum of the water head pressure h (60 kPa), the expected maximum pipe pressure loss $H_P$ (5 kPa), and the expected maximum air diffuser pressure loss $H_A$ (3 kPa), i.e. 68 kPa, is set as the air blow pressure of the blower unit 20. With the first method, air is supplied to the air blow system of each tank 10 at excessive pressure. Consequently, the air blow electricity of the blower unit 20 is wasted, and efficient use of electricity in water treatment cannot be achieved.

Next, the operation in the case of applying the second method will be described below. In the second method, the pressure loss in each air blow system is calculated based on the water quality of water to be treated in the corresponding tank 10, and air is supplied to the plurality of tanks 10 at the air blow pressure corresponding to the calculated maximum pressure loss $H_L$, as mentioned above. Suppose the pressure loss $H_L$ in the air blow system of the tank 10A is 4 kPa, the pressure loss $H_L$ in the air blow system of the tank 10B is 3 kPa, and the pressure loss $H_L$ in the air blow system of the tank 10C is 2 kPa. Also suppose the air diffuser pressure loss $H_A$ is 2 kPa. In this case, the sum of the water head pressure h (60 kPa), the maximum pressure loss $H_L$ (4 kPa), and the air diffuser pressure loss $H_A$ (2 kPa), i.e. 66 kPa, is set as the air blow pressure of the blower unit 20. With the second method, the air blow pressure of the blower unit 20 is set based on the actual pressure loss $H_L$ in the air blow system of each tank 10 and the actual air diffuser pressure loss $H_A$, so that the air blow pressure of the blower unit 20, i.e. the air blow electricity of the blower unit 20, can be reduced as compared with the first method. With the second method, however, air is blown at excessive pressure into the tanks 10B and 10C other than the tank 10 whose air blow system is maximum in pressure loss $H_L$. Consequently, the air blow electricity of the blower unit 20 is wasted, and efficient use of electricity in water treatment cannot be achieved.

In this embodiment, the supply of the water to be treated to each of the plurality of tanks 10 is controlled according to the pressure loss $H_L$ in the air blow system of each of the plurality of tanks 10 (so as to equalize the respective pressure losses $H_L$ in the air blow systems of the plurality of reaction tanks 10), thus reducing the wasted air blow electricity of the blower unit 20 and achieving efficient use of electricity in water treatment. The details of the control of the supply of the water to be treated to each of the plurality of tanks 10 according to the pressure loss $H_L$ in the air blow system of each of the plurality of tanks 10 in this embodiment will be described below.

The water-to-be-treated supply control unit 56 controls the pollutant load ratio or the pollutant load amount of the water to be treated supplied to each of the plurality of tanks 10 so as to reduce the difference between the respective pressure losses $H_L$ in the air blow systems of the plurality of tanks 10. The pollutant load ratio is the ratio of the pollutant load of the water to be treated in each tank 10 to the pollutant load of the water to be treated in all tanks 10.

The case of controlling the pollutant load ratio of the water to be treated supplied to each of the plurality of tanks 10 will be described first. Suppose the concentration of the water to be treated supplied to each tank 10 is constant. Assuming that the total amount of the water to be treated supplied to the plurality of tanks 10 is constant, the water-to-be-treated supply control unit 56 controls the amount of the water to be treated supplied to each tank 10. The pollutant load is expressed as the product of the amount of the water to be treated supplied to the tank 10 and the concentration of the water to be treated supplied to the tank 10, as mentioned above. In the case where the concentration of the water to be treated is constant, the pollutant load ratio of the water to be treated supplied to each tank 10 is proportional to the amount of the water to be treated supplied to the tank 10.

When the pollutant load ratio of the water to be treated supplied to each tank 10 changes, the required air amount in the tank 10 changes and also the pressure loss $H_L$ in the air blow system of the tank 10 changes. Hence, by controlling the pollutant load ratio of the water to be treated supplied to each of the plurality of tanks 10 so as to reduce the difference between the respective pressure losses in the air blow systems of the plurality of tanks 10, the respective pressure losses in the air blow systems can be equalized. As a result of the respective pressure losses in the air blow systems being equalized, the wasted air blow electricity of the blower unit 20 can be reduced, and efficient use of electricity in water treatment can be achieved.

An example of control of the pollutant load ratio of water to be treated supplied to each of the plurality of tanks 10 according to the pressure loss $H_L$ in the air blow system of each of the plurality of tanks 10 by the water-to-be-treated supply control unit 56 will be described below. Suppose water to be treated of 2000 m³/hr is supplied to each of the tanks 10A, 10B, and 10C, that is, the total amount of the water to be treated supplied to the tanks 10A, 10B, and 10C is 6000 m³/hr. Also suppose the pressure loss $H_{LA}$ in the air blow system of the tank 10A is 4 kPa, the pressure loss $H_{LB}$ in the air blow system of the tank 10B is 3 kPa, the pressure loss $H_{LC}$ in the air blow system of the tank 10C is 2 kPa, and the air diffuser pressure loss $H_A$ in each of the tanks 10A, 10B, and 10C is 2 kPa.

While maintaining the total amount of the water to be treated supplied to the tanks 10A, 10B, and 10C constant, the water-to-be-treated supply control unit 56 reduces the amount of the water to be treated supplied to the tank 10A maximum in pressure loss $H_L$ and increases the amount of the water to be treated supplied to the tank 10C minimum in pressure loss $H_L$. For example, the water-to-be-treated supply control unit 56 sets the amount of the water to be treated supplied to the tank 10A to 1500 m³/hr, and the amount of the water to be treated supplied to the tank 10C to 2500 m³/hr. Meanwhile, the water-to-be-treated supply control unit 56 maintains the amount of the water to be treated supplied to the tank 10B at 2000 m³/hr. Thus, the water-to-be-treated supply control unit 56 calculates the pressure loss $H_L$ (first calculated pressure loss) in the air blow system (first air blow system among the plurality of air blow systems) connected to the tank 10A (first tank among the plurality of tanks 10) and the pressure loss $H_L$ (second calculated pressure loss) in the air blow system (second air blow system among the plurality of air blow systems) connected to each of the tanks 10B and 10C (second tank among the plurality of tanks 10). Here, the second calculated pressure loss is less than the first calculated pressure loss. In this case, the water-to-be-treated supply control unit 56 reduces the amount of the water to be treated supplied to the tank 10A. The water-to-be-treated supply control unit 56 calculates the pressure loss $H_L$ (first calculated pressure loss) in the air blow system (first air blow system among the plurality of air blow systems) connected to each of the tanks 10A and 10B (first tank among the plurality of tanks 10) and the pressure loss $H_L$ (second calculated pressure loss) in the air blow system (second air blow system in the plurality of air blow systems) connected to the tank 10C (second tank among the plurality of tanks 10). Here, the second calculated pressure loss is less than the first calculated pressure loss. In this case, the water-to-be-treated supply control unit 56 increases the amount of the water to be treated supplied to the tank 10C.

That is, the water-to-be-treated supply control unit 56 specifies the first calculated pressure loss and the second calculated pressure loss less than the first calculated pressure loss among the pressure losses $H_L$ calculated for the respective air blow systems of the plurality of tanks 10. The water-to-be-treated supply control unit 56 also specifies the first tank connected to the air blow system having the first calculated pressure loss and the second tank connected to the air blow system having the second calculated pressure loss. The water-to-be-treated supply control unit 56 reduces the amount of the water to be treated supplied to the first tank. Moreover, the water-to-be-treated supply control unit 56 increases the amount of the water to be treated supplied to the second tank.

As a result of reducing the amount of the water to be treated supplied to the tank 10A, for example, the air diffuser pressure loss $H_{AA}$ in the air diffuser 12 in the tank 10A is reduced to 1.8 kPa. Moreover, as a result of reducing the amount of the water to be treated supplied to the tank 10A, the required air amount in the tank 10A is reduced. As a result of the required air amount and the air diffuser pressure loss $H_{AA}$ in the tank 10A being reduced, the pipe pressure loss $H_{PA}$ in the air blow system of the tank 10A is reduced from before the control of the supply amount of the water to be treated. For example, while the pipe pressure loss $H_{PA}$ before the control of the supply amount of the water to be treated is 4 kPa as mentioned above, the pipe pressure loss $H_{PA}$ after the control of the supply amount of the water to be treated is reduced to 3.2 kPa.

As a result of increasing the amount of the water to be treated supplied to the tank 10C, for example, the air diffuser pressure loss $H_{AC}$ in the air diffuser 12 in the tank 10C is increased to 2.2 kPa. Moreover, as a result of increasing the amount of the water to be treated supplied to the tank 10C, the required air amount in the tank 10C is increased. As a result of the required air amount and the air diffuser pressure loss $H_{AC}$ in the tank 10C being increased, the pipe pressure loss $H_{PC}$ in the air blow system of the tank 10C is increased from before the control of the supply amount of the water to be treated. For example, while the pipe pressure loss $H_{PC}$ before the control of the supply amount of the water to be treated is 2 kPa, the pipe pressure loss $H_{PC}$ after the control of the supply amount of the water to be treated is increased to 2.8 kPa.

Thus, the water-to-be-treated supply control unit 56 controls the supply amount of the water to be treated to each of the plurality of tanks 10 so as to equalize the respective pressure losses $H_L$ in the air blow systems of the plurality of reaction tanks 10. As a result of controlling the supply amount of the water to be treated, the pressure loss required in the air blow system of the tank 10A is 65 kPa (=60 kPa+3.2 kPa+1.8 kPa), the pressure loss required in the air blow system of the tank 10B is 65 kPa (=60 kPa+3 kPa+2 kPa), and the pressure loss required in the air blow system of the tank 10C is 65 kPa (=60 kPa+2.8 kPa+2.2 kPa). Thus, the respective pressure losses in the air blow systems of the tanks 10 are equalized. Consequently, air is blown in proper quantity into each tank 10 with appropriate pressure loss. Moreover, the same amount of water to be treated can be treated at lower air blow pressure than in the first and second methods. Hence, the wasted air blow electricity of the blower unit 20 can be reduced, and efficient use of electricity in water treatment can be achieved.

The case of controlling the pollutant load amount of the water to be treated supplied to each of the plurality of tanks 10 will be described next. Suppose the water to be treated of 2000 m³/hr is supplied to each of the tanks 10A, 10B, and 10C. Also suppose the pressure loss $H_{LA}$ in the air blow system of the tank 10A is 4 kPa, the pressure loss $H_{LB}$ in the air blow system of the tank 10B is 3 kPa, and the pressure loss $H_{LC}$ in the air blow system of the tank 10C is 2 kPa.

When the pressure loss $H_L$ in the air blow system of one tank 10 is lower than the pressure loss $H_L$ in the air blow system of another tank 10, the water-to-be-treated supply control unit 56 increases the pollutant load amount of the water to be treated supplied to the tank 10 to be greater than that of the other tank 10. Assuming that the concentration of the water to be treated is constant, the water-to-be-treated supply control unit 56 maintains the amount of the water to be treated supplied to the tank 10A, and increases the amount of the water to be treated supplied to each of the tanks 10B and 10C. Here, the water-to-be-treated supply control unit 56 increases the amount of the water to be treated supplied to the tank 10C by a greater amount than the amount of the water to be treated supplied to the tank 10B. Specifically, for example, the water-to-be-treated supply control unit 56 maintains the amount of the water to be treated supplied to the tank 10A at 2000 m³/hr, increases the amount of the water to be treated supplied to the tank 10B to 2500 m³/hr, and increases the amount of the water to be treated supplied to the tank 10C to 3000 m³/hr.

Thus, as a result of increasing the supply amount of the water to be treated to each of the tanks 10B and 10C, the air diffuser pressure loss $H_A$ and the pipe pressure loss $H_P$ are increased, and the pressure loss $H_L$ is increased. Since the increase of the supply amount of the water to be treated is greater in the tank 10C than in the tank 10B, the increase of the pressure loss $H_{LC}$ in the air blow system of the tank 10C is greater than the increase of the pressure loss $H_{LB}$ in the air blow system of the tank 10B. Accordingly, the respective pressure losses $H_{LB}$ and $H_{LC}$ in the air blow systems of the tanks 10B and 10C approach the pressure loss $H_{LA}$ in the air blow system of the tank 10A, and thus the respective pressure losses in the air blow systems of the plurality of tanks 10 are equalized. Consequently, air is supplied in proper quantity to each tank 10 with appropriate pressure loss. Hence, the wasted air blow electricity of the blower unit 20 can be reduced, and efficient use of electricity in water treatment can be achieved.

Although the above describes an example in which, when the pressure loss $H_L$ in the air blow system of one tank 10 is lower than the pressure loss $H_L$ in the air blow system of another tank 10, the water-to-be-treated supply control unit 56 increases the pollutant load amount of the water to be treated supplied to the tank 10 to be greater than that of the other tank 10, the presently disclosed techniques are not limited to such. When the pressure loss $H_L$ in the air blow system of one tank 10 is higher than the pressure loss $H_L$ in the air blow system of another tank 10, the water-to-be-treated supply control unit 56 may reduce the pollutant load amount of the water to be treated supplied to the tank 10 to be smaller than that of the other tank 10. In this way, too, the respective pressure losses in the air blow systems of the plurality of tanks 10 are equalized, so that the wasted air blow electricity of the blower unit 20 can be reduced and efficient use of electricity in water treatment can be achieved.

Although the above describes an example in which the concentration of the water to be treated supplied to each tank 10 is constant, the presently disclosed techniques are not limited to such. As mentioned above, the pollutant load is expressed as the product of the amount of the water to be treated supplied to the tank 10 and the concentration of the water to be treated supplied to the tank 10. Accordingly, the water-to-be-treated supply control unit 56 may control the pollutant load amount or the pollutant load ratio of the water to be treated supplied to each tank 10 by controlling the concentration of the water to be treated supplied to the tank 10.

In the case of controlling the supply of the water to be treated to each of the plurality of tanks 10, for example, the water-to-be-treated supply control unit 56 controls the water to be treated to each of the plurality of tanks 10 with any pollutant load ratio or pollutant load amount. If this control results in the difference between the respective pressure losses $H_L$ in the air blow systems of the plurality of tanks 10 being within a predetermined range, the water-to-be-treated supply control unit 56 adopts the pollutant load ratio or pollutant load amount. If the difference between the respective pressure losses $H_L$ in the air blow systems of the plurality of tanks 10 is outside the predetermined range, on the other hand, the water-to-be-treated supply control unit 56 changes the pollutant load ratio or pollutant load amount based on the degree of deviation from the redetermined range, and compares the respective pressure losses $H_L$ in the air blow systems of the plurality of tanks 10 again. By repeating this process, the water-to-be-treated supply control unit 56 determines a pollutant load ratio or pollutant load amount with which the difference between the respective pressure losses $H_L$ in the air blow systems of the plurality of tanks 10 is within the predetermined range.

As described above, in this embodiment, the water treatment system 1 includes: a plurality of tanks 10; a plurality of air blow systems (for example, branch pipes 34 (34A, 34B, 34C)) connected to the respective plurality of tanks 10; a blower unit 20 configured to supply air to the plurality of tanks 10 through the air blow systems; and a control circuit 50 (control device). The control circuit 50 is configured to calculate a pressure loss $H_L$ in an air blow system of each of the plurality of tanks, and control supply of water to be treated to each of the plurality of tanks 10, according to the calculated pressure loss $H_L$ in the air blow system of each of the plurality of tanks 10.

By controlling the supply of the water to be treated to each of the plurality of tanks 10 according to the pressure loss $H_L$ in the air blow system of each of the plurality of tanks 10, the required air amount in each tank 10 changes, and the respective pressure losses in the air blow systems of the tanks 10 are equalized. This prevents supply of air to the air blow system of each tank 10 at excessive pressure, so that the wasted air blow electricity of the blower unit 20 can be reduced and efficient use of electricity in water treatment can be achieved.

While the presently disclosed techniques have been described by way of the drawings and embodiments, various changes and modifications may be easily made by those of ordinary skill in the art based on the present disclosure. Such changes and modifications are therefore included in the scope of the present disclosure. For example, the functions included in the means, steps, etc. may be rearranged without logical inconsistency, and a plurality of means, steps, etc. may be combined into one means, step, etc. and a means, step, etc. may be divided into a plurality of means, steps, etc. The above description merely relates to one of the disclosed embodiments, and various changes may be made within the scope of claims.

REFERENCE SIGNS LIST 1 water treatment system
10, 10A, 10B, 10C tank 12 air diffuser
13 water pump
20 blower unit
22, 22A, 22B, 22C, 22D air blower
30 air blow pipe
31 introduction pipe
32 header pipe
34, 34A, 34B, 34C branch pipe
36 introduction valve
40 control apparatus
41 nitric acid meter
42 ammonia meter
43 intake air measurement unit
44 header pipe internal pressure measurement unit
45 branch pipe air volume measurement unit
50 control unit
51 acquisition unit
52 required air amount calculation unit
53 target pipe internal pressure calculation unit (pressure loss calculation unit)
54 air blow control unit
55 introduced air control unit
56 water-to-be-treated supply control unit
501 control circuit (control device)
502 memory
503 bus

The invention claimed is:

1. A water treatment system comprising:
a plurality of tanks;
a plurality of air blow systems connected to tanks respectively;
a blower unit configured to supply air to tanks through the air blow systems; and
a control device configured to:
calculate a gas pressure losses which are pressures of a gas lost in each of the air blow systems based on a sum of a water head gas pressure of the water to be treated in each of the tanks, a pipe gas pressure loss in a path from the blower unit to each of the tanks, a ventilation gas pressure loss in the path from the blower unit to each of the tanks and an air diffuser gas pressure loss by an air diffuser of each of tanks, which is dependent on a pollutant load of the water to be treated in each of the tanks; and
control supply of water to be treated to each of the tanks, according to the calculated gas pressure losses in each of the air blow systems.

2. The water treatment system according to claim 1, wherein the control device is configured to control supply of the water to be treated to each of the tanks so as to equalize respective gas pressure losses in air blow systems.

3. The water treatment system according to claim 2, wherein the control device is configured to control an amount of supply of the water to be treated to each of the tanks so as to equalize respective gas pressure losses in the air blow systems.

4. The water treatment system according to claim 1, wherein the control device is configured to acquire a concentration of pollutants in the water to be treated supplied to each of the tanks, and control supply of the water to be treated to each of the tanks, according to the calculated gas pressure losses and the concentrations.

5. The water treatment system according to claim 1, wherein the calculated gas pressure losses include at least a first calculated pressure loss in a first air blow system among the air blow systems, which is connected to a first tank among the tanks and a second calculated pressure loss in a second air blow system among the air blow systems, which is connected to a second tank among the tanks,
wherein if the second calculated pressure loss is less than the first calculated pressure loss,
the control device is configured to reduce an amount of supply of water to be treated to the first tank.

6. The water treatment system according to claim 1, wherein the calculated gas pressure losses include at least a first calculated pressure loss in a first air blow system among the air blow systems, which is connected to a first tank among the tanks and a second calculated pressure loss in a second air blow system among the air blow systems, which is connected to a second tank among the tanks,
wherein if the second calculated pressure loss is less than the first calculated pressure loss,
the control device is configured to increase an amount of supply of water to be treated to the second tank.

7. The water treatment system according to claim 5, wherein the control device is configured to increase an amount of supply of water to be treated to the second tank.

8. The water treatment system according to claim 1, further comprising a plurality of air diffusers in the plurality of tanks respectively and a plurality of branch pipes connected to the air diffusers respectively, wherein each of the air blow systems includes the branch pipe and the air diffuser connected to the branch pipe.

9. The water treatment system according to claim 1, wherein the control device is configured to:
specify a first calculated pressure loss and a second calculated pressure loss less than the first calculated pressure loss, among the calculated gas pressure losses,
specify a first tank among the tanks, which is connected to a first air blow system having the first calculated pressure loss and a second tank among the tanks, which is connected to a second air blow system having the second calculated pressure loss, and
reduce an amount of supply of water to be treated to the first tank.

10. The water treatment system according to claim 9, wherein the control device is configured to increase an amount of supply of water to be treated to the second tank.

11. The water treatment system according to claim 1, wherein the concentration of the water to be treated supplied to be the tank is at least biochemical oxygen demand (BOD), chemical oxygen demand (COD), or a concentration of NH4.

12. The water treatment system according to claim 1, wherein the control device is configured to:
calculate, for each of the plurality of tanks, a required air amount necessary for adjusting the water quality of the water to be treated in each of the plurality of tanks to predetermined target water quality, based on a state of water to be treated stored in each of the plurality of tanks and an amount of air supplied to each of the plurality of reaction tanks, and
calculate the pipe gas pressure loss in the path from the blower unit to each of the tanks based on the calculated required air amount for each of the plurality of tanks.

13. The water treatment system according to claim 1, wherein the control device is configured to:
calculate the pollutant load of the water to be treated in each of the tanks by multiplying the amount of the water to be treated to each of the tanks and the concentration of the water to be treated to each of the tanks.

14. A water treatment method in a water treatment system that includes: a plurality of tanks; a plurality of air blow systems connected to tanks respectively; and a blower unit configured to supply air to tanks through the air blow systems, the water treatment method comprising:
　　calculating a gas pressure losses which are pressures of a gas lost in each of the air blow systems based on a sum of a water head gas pressure of the water to be treated in each of the tanks, a pipe gas pressure loss in a path from the blower unit to each of the tanks, a ventilation gas pressure loss in the path from the blower unit to each of the tanks and an air diffuser gas pressure loss by an air diffuser of each of tanks, which is dependent on a pollutant load of the water to be treated in each of the tanks; and
　　controlling supply of water to be treated to each of the tanks, according to the calculated gas pressure losses in each of the air blow systems.

15. A non-transitory computer readable recording medium recording a program for use in a computer in a water treatment system that includes: a plurality of tanks; a plurality of air blow systems connected to tanks respectively; and a blower unit configured to supply air to tanks through the air blow systems, the program causing the computer to execute
　　a process of calculating a gas pressure losses which are pressures of a gas lost in each of the air blow systems based on a sum of a water head gas pressure of the water to be treated in each of the tanks, a pipe gas pressure loss in a path from the blower unit to each of the tanks, a ventilation gas pressure loss in the path from the blower unit to each of the tanks and an air diffuser gas pressure loss by an air diffuser of each of tanks, which is dependent on a pollutant load of the water to be treated in each of the tanks; and
　　a process of controlling supply of water to be treated to each of the tanks, according to the calculated gas pressure losses in each of the air blow systems.

\* \* \* \* \*